United States Patent
Kishimoto et al.

(10) Patent No.: US 10,471,736 B2
(45) Date of Patent: Nov. 12, 2019

(54) METHOD FOR PROVIDING THERMAL TRANSFER IMAGE DATA, METHOD FOR FORMING IMAGES, AND IMAGE DISPLAY DEVICE

(71) Applicant: TOPPAN PRINTING CO., LTD., Tokyo (JP)

(72) Inventors: Yasushi Kishimoto, Tokyo (JP); Tomoyuki Marugame, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/104,581

(22) Filed: Aug. 17, 2018

(65) Prior Publication Data
US 2019/0016151 A1 Jan. 17, 2019

Related U.S. Application Data

(63) Continuation of application No. PCT/JP2017/007039, filed on Feb. 24, 2017.

(30) Foreign Application Priority Data

Feb. 26, 2016 (JP) ................................ 2016-035490

(51) Int. Cl.
*B41J 2/52* (2006.01)
*B41J 2/325* (2006.01)
(Continued)

(52) U.S. Cl.
CPC ................. *B41J 2/52* (2013.01); *B41J 2/325* (2013.01); *B41M 5/382* (2013.01); *H04N 1/405* (2013.01); *B42D 25/328* (2014.10); *B42D 25/40* (2014.10)

(58) Field of Classification Search
CPC .............. B41J 2/36; B41J 2/2132; H04N 1/50
See application file for complete search history.

(56) References Cited

U.S. PATENT DOCUMENTS 5,175,563 A * 12/1992 Fushimoto ............... B41J 2/325
347/172
5,239,926 A * 8/1993 Nubson .................... B41J 3/407
101/425

(Continued)

FOREIGN PATENT DOCUMENTS

EP 1 946 932 A1 7/2008
JP H09-46522 A 2/1997
(Continued)

OTHER PUBLICATIONS

Extended European Search Report dated Feb. 12, 2019 in corresponding application No. 17756633.8.
(Continued)

*Primary Examiner* — John Zimmermann
(74) *Attorney, Agent, or Firm* — Foley & Lardner LLP

(57) ABSTRACT

Thermal transfer image data is used to transfer part of a transfer material layer in a transfer ribbon to an image-receiving layer in an intermediate transfer ribbon to form a plurality of image cells on the intermediate transfer ribbon. A method for providing thermal transfer image data includes converting a multitone input image into a multitone image having fewer different tone values than the input image, based on a predetermined threshold; and dithering respective tone values of the image.

12 Claims, 7 Drawing Sheets

(51) Int. Cl.
*B41M 5/382* (2006.01)
*H04N 1/405* (2006.01)
*B42D 25/40* (2014.01)
*B42D 25/328* (2014.01)

(56) References Cited

U.S. PATENT DOCUMENTS

| | | | |
|---|---|---|---|
| 6,106,172 A * | 8/2000 | No | G06K 15/028 400/120.01 |
| 6,614,459 B2 | 9/2003 | Fujimoto et al. | |
| 6,870,642 B2 | 3/2005 | Ostromoukhov | |
| 7,907,157 B2 * | 3/2011 | Bouchard | H04N 1/506 347/176 |
| 7,961,962 B2 | 6/2011 | Cittadini et al. | |
| 2008/0152875 A1 * | 6/2008 | Tomita | B44C 1/17 428/195.1 |
| 2009/0066776 A1 | 3/2009 | Takita et al. | |
| 2010/0118101 A1 * | 5/2010 | Yamakuni | B41J 2/325 347/188 |
| 2011/0069328 A1 | 3/2011 | Ulichney et al. | |

FOREIGN PATENT DOCUMENTS

| | | |
|---|---|---|
| JP | 2000-141863 A | 5/2000 |
| JP | 2002-226740 A | 8/2002 |
| JP | 2003-170685 A | 6/2003 |
| JP | 2012-068537 A | 4/2012 |
| JP | 2014-076614 A | 5/2014 |
| JP | 5637371 B2 | 12/2014 |

OTHER PUBLICATIONS

International Search Report with English language translation and Written Opinion issued in International Application No. PCT/JP2017/007039 dated Apr. 25, 2017.

* cited by examiner

METHOD FOR PROVIDING THERMAL TRANSFER IMAGE DATA, METHOD FOR FORMING IMAGES, AND IMAGE DISPLAY DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/007039, filed on Feb. 24, 2017, which is based upon and claims the benefit of priority to Japanese Patent Application No. 2016-035490, filed on Feb. 26, 2016. The disclosures of which are all hereby incorporated herein by reference in their entireties.

TECHNICAL FIELD

The technology of the present disclosure relates to a method for providing thermal transfer image data for use in the production of an image display device that displays an image in an individual authentication medium formed by a transfer ribbon, a method for forming images, and an image display device.

BACKGROUND ART

As an example of an individual authentication medium, a passport has an owner information part where an image of an owner's face is displayed. A facial image on a sheet of photographic paper, such as a facial photograph, may be tampered with by replacement with another facial photograph. Thus, in recent years, the owner information part is formed by digitizing the information on the facial image and representing the digitized data on a booklet page.

In addition to simple digital printing of a facial image, other image representation methods have been adopted to represent and fix an image of an owner's face on paper. Such image representation methods include, for example, a method for representing a facial image using fluorescent inks, a method for representing a facial image using inks containing colorless or light-colored fluorescent colorants and colored pigments, and a method for representing a facial image using pearl pigments (see, for example, PTL 1, 2, and 3).

However, even such facial images represented by these image representation methods would be easy to forge and alter because these images are simple in visual effect, and it is difficult to determine the genuineness or otherwise of the facial images by visual inspection.

Thus, producing an easily visually verifiable image display device by transferring parts of a transfer layer including a diffraction grating in a transfer ribbon to an image-receiving layer in an intermediate transfer ribbon to form a plurality of image cells on the intermediate transfer ribbon has been suggested (see, for example, PTL 4).

CITATION LIST

[Patent Literature] [PTL 1] JP 2000-141863 A; [PTL 2] JP 2002-226740 A; [PTL 3] JP 2003-170685 A; [PTL 4] JP 5637371 B2.

SUMMARY OF THE INVENTION

[Proposed Solution to Problem]
In the image display device described above, a transferred image is poor in gradation representativeness, because a multitone input image is converted into an image having fewer tone levels, around three to four tone levels, than the number of the tone levels in the input image. Therefore, portions of the input image with continuous variation in tone value are converted into portions of the transferred image with discontinuous variation in tone value, resulting in decreased representativeness of gradation.

An object of the technology of the present disclosure is to provide a method for providing thermal transfer image data that reduces the incidence of or even prevents portions of an input image with continuous variation in tone value from being reduced in representativeness of gradation in a transferred image to thereby represent continuous variation in tone value, a method for forming images, and an image display device.

The technology of the present disclosure is to improve or to even solve these.

A first aspect is a method for providing thermal transfer image data, the thermal transfer image data being used to transfer part of a transfer material layer in a transfer ribbon to an image-receiving layer in an intermediate transfer ribbon to form a plurality of image cells. The method includes converting a multitone input image into a multitone image having fewer different tone values than the input image, based on a predetermined threshold, and dithering respective tone values of the image.

In a second aspect, the method preferably further includes, before performing the dithering, dividing the input image into a plurality of interleaved regions and providing a difference in tone values between adjacent ones of the plurality of regions in the image.

In a third aspect, the dividing of the input image into a plurality of regions preferably includes dividing the input image into stripes.

In a fourth aspect, the providing of a difference in tone values preferably includes dividing the tone values of the input image into a low-tone-value range, an intermediate-tone-value range, and a high-tone-value range; in the low-tone-value range, making the difference in tone values greater as the tone value is fewer; in the high-tone-value range, making the difference in tone values greater as the tone value is higher; and in the intermediate-tone-value range, making the difference in tone values smaller than the differences in tone values set in the low-tone-value range and the high-tone-value range.

In a fifth aspect, the method preferably further includes limiting the regions with the difference in tone values to the regions with continuous variation in the tone value.

A sixth aspect is a method for forming images, the method including: based on image data provided by the method for providing thermal transfer image data, transferring part of a transfer material layer in the transfer ribbon to an image-receiving layer in an image display device; and forming an image with a plurality of image cells formed from the transferred transfer material layer.

A seventh aspect is a method for forming images, the method including: based on image data provided by the method for providing thermal transfer image data, transferring part of a transfer material layer in the transfer ribbon to an image-receiving layer in an intermediate transfer ribbon; and forming an image with a plurality of image cells formed from the transferred transfer material layer.

In an eighth aspect, the transfer material layer formed in the transfer ribbon preferably includes a relief structure.

A ninth aspect is an image display device formed by the method for forming images.

[Desired Advantageous Effects of Invention]

The present disclosed technology reduces and even prevents degradation of gradation representativeness even in portions of an input image with continuous variation in tone value in a transferred image at providing thermal transfer image data for forming image cells.

DESCRIPTION OF REPRESENTATIVE EMBODIMENTS

Figure 1:
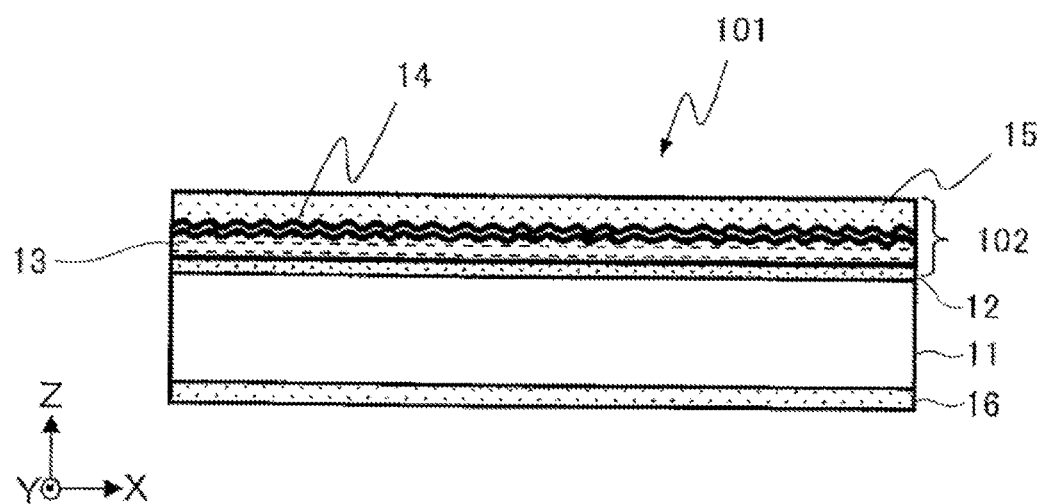
FIG. 1 is a schematic cross-sectional view of an example of a transfer ribbon according to one embodiment.

A representative embodiment of a method for providing thermal transfer image data according to the technology of the present disclosure will be described with reference to FIGS. 1 to 12. With reference to the drawings, preferred or representative embodiments of the present invention will be described in detail. It is to be understood that the present invention is not limited to the following embodiment, which is intended to be representative of the present invention. The representative embodiment described below is merely an example of the present invention, and the design thereof could be appropriately changed by one skilled in the art. In the embodiment, the same or corresponding components are denoted by the same reference characters, and duplicate description thereof will be omitted.

FIG. 1 is a schematic cross-sectional view of an example of a transfer ribbon in the embodiment.

A transfer ribbon 101 of FIG. 1 includes a base material 11 and a transfer material layer 102 releasably supported by a release layer 12.

The base material 11 is a resin film or a resin sheet, for example. The base material 11 is formed from a high-heat-resistant material such as polyethylene terephthalate, polyethylene naphthalate, triacetyl cellulose, polycarbonate, polyimide, or the like, for example. A principal surface of the base material 11 supporting the transfer material layer 102 may be provided with a release layer containing a fluororesin or a silicone resin, for example. The base material 11 preferably has a thickness of 5 µm or more and 25 µm or less.

The transfer material layer 102 includes a release layer 12, a relief structure formation layer 13, a reflection layer 14, and an adhesion layer 15.

The release layer 12 is formed on the base material 11. The release layer 12 realizes stable peeling of the transfer material layer 102 from the base material 11 and facilitates the adhesion of the adhesion layer 15 to an image-receiving layer. The release layer 12 transmits light and is typically transparent. The material of the release layer 12 may be a thermoplastic resin such as an acrylic resin, a polyester resin, a cellulose resin, or an epoxy resin. The release layer 12 may contain particles. The particles in the release layer 12 may be inorganic particles or polymer particles. The inorganic particles may be formed from silica or alumina. The polymer particles may be PTFE resin particles or acrylic resin particles. The release layer 12 preferably has a thickness of 0.5 µm or more and 2 µm or less. The release layer 12 may be omitted.

The relief structure formation layer 13 is formed on the release layer 12. The relief structure formation layer 13 preferably has a function of diffracting light as a relief structure. The relief structure diffracting light may include a hologram and a diffraction grating element. In this example, the relief structure formation layer 13 is a transparent layer with a relief structure on the surface. The material for the transparent layer may be a resin such as a photocurable resin, a thermosetting resin, or a thermoplastic resin. The relief structure formation layer 13 may be a volume hologram. The relief structure formation layer 13 preferably has a thickness of 0.5 µm or more and 3 µm or less.

The reflection layer 14 is formed on the relief structure formation layer 13. The reflection layer 14 may be omitted but providing the reflection layer 14 would improve visibility of an image displayed by the diffraction structure. The reflection layer 14 preferably has a thickness of 10 nm or more and 60 nm or less.

The reflection layer 14 may be a transparent reflection layer or a non-transparent metal reflection layer, for example. The reflection layer 14 can be formed by a vacuum film formation method such as vacuum deposition or sputtering, for example.

The transparent layer may be a layer formed of a transparent material different in refractive index from the relief structure formation layer 13, for example. The transparent reflection layer formed from a transparent material may have a single-layer structure or a multi-layer structure. When the transparent reflection layer has a multi-layer structure, the transparent reflection layer may be designed to cause reflection and interference repetition. The transparent material for the transparent reflection layer may be a transparent dielectric. The transparent dielectric may be an inorganic transparent dielectric material or an organic transparent dielectric material. The organic transparent dielectric material may be a melamine resin, a fluororesin, a polystyrene resin, an acrylic resin, or a copolymer of thereof. The inorganic transparent dielectric material may be a metallic compound. The transparent dielectric of metallic compound may be zinc sulfide, aluminum oxide, titanium dioxide, or the like.

Alternatively, the transparent reflection layer may be a metal layer with a thickness of less than 20 nm. The material for the metal layer may be a simple metal such as chrome, nickel, aluminum, iron, titanium, silver, gold, copper, or an alloy thereof, for example.

The non-transparent metal reflection layer may be a metal layer similar to the metal layer usable for the transparent reflection layer, except that the non-transparent metal reflection layer is thicker than the transparent reflection layer.

The adhesion layer 15 is formed on the reflection layer 14. The adhesion layer 15 is formed from a transparent resin, for example. The transparent resin may be a thermoplastic resin or a thermosetting resin, for example. For example, the transparent resin may be an acrylic resin, a polyester resin, a vinyl chloride-vinyl acetate copolymer, or a polyamide-imide resin. The transparent resin may contain particles. The particles in the transparent resin may be inorganic particles or polymer particles. The inorganic particles may be formed from silica or alumina. The polymer particles may be PTFE resin particles or acrylic resin particles. The adhesion layer 15 preferably has a thickness of 1 nm or more and 5 μm or less.

The base material 11 has a back coat layer 16 formed on the surface opposite to the surface where the transfer material layer 102 is formed. The back coat layer 16 is provided on the transfer ribbon 101 so that the transfer ribbon 101 can be heated and transferred by a thermal head as an image transfer head at the time of thermal transfer of the transfer ribbon 101. The back coat layer 16 is also provided on the transfer ribbon 101 to increase contactiveness to the thermal head, improve slip, and enhance thermal conductivity. The material for the back coat layer 16 may be silicon acrylate, for example. The back coat layer 16 preferably has a thickness of 0.1 μm or more and 1 μm or less. The back coat layer 16 may be omitted.

Figure 2:
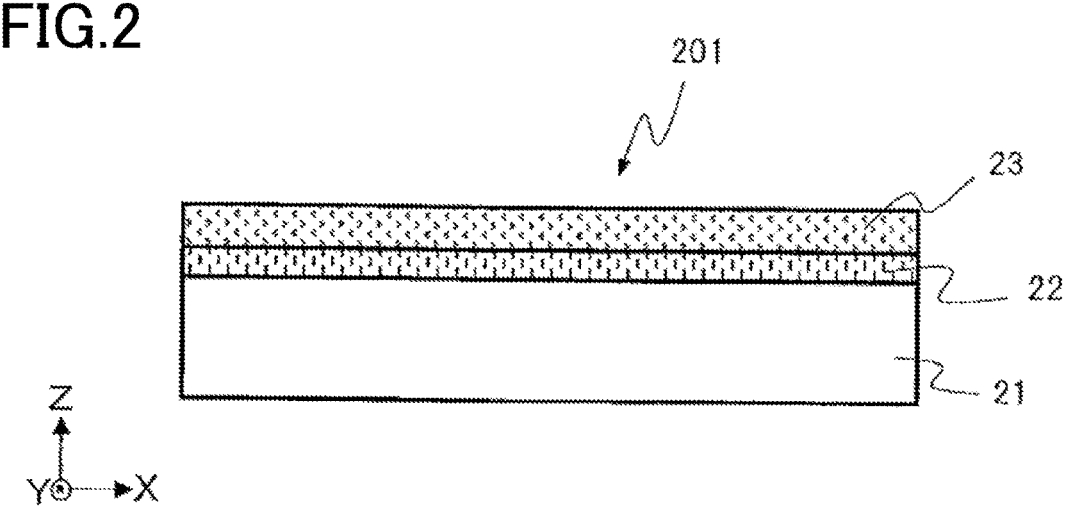
FIG. 2 is a schematic cross-sectional view of an example of an intermediate transfer ribbon.

FIG. 2 is a schematic cross-sectional view of an example of an intermediate transfer ribbon according to the embodiment.

An intermediate transfer ribbon 201 of FIG. 2 includes a base material 21 and an image-receiving layer 23 releasably supported by a releasable protection layer 22. The base material 21 is a resin film or a resin sheet, for example. The base material 21 is formed from a high-heat-resistant material such as polyethylene terephthalate, polyethylene naphthalate, triacetyl cellulose, polycarbonate, polyimide, or the like, for example. A principal surface of the base material 21 supporting the image-receiving layer 23 may be provided with a release layer containing a fluororesin or a silicone resin, for example. The base material 21 preferably has a thickness of 10 μm or more and 50 μm or less.

The transfer material layer 102 can be transferred by the thermal head to a card or a paper base material to form an image. In this case, the card or the paper base material may include the image-receiving layer 23. The card may be formed from plastic, paper, or a composite material of plastic, and the paper base material may be cotton paper or coated paper. The plastic may be vinyl chloride, PET, or polycarbonate. The card preferably has a thickness of 0.2 mm or more and 1 mm or less. The paper base material preferably has a thickness of 0.2 mm or more and 11 mm or less. The transfer material layer 102 preferably has a thickness of 2 μm or more and 10 μm or less.

The releasable protection layer 22 function as a protective layer that stabilizes the release of the image-receiving layer 23 from the base material 21 and promotes resistance on the surface of the image-receiving layer 23, that is, enhances the resistance. The releasable protection layer 22 transmits light and is typically transparent. The material for the releasable protection layer 22 may be a single one of various resins such as acrylic resin, polyester resin, urethane resin, cellulose resin, melamine resin, and polyimide resin, for example. Alternatively, the material for the releasable protection layer 22 may be a mixture of two or more of these resins. The releasable protection layer 22 preferably has a thickness of 0.5 μm or more and 5 μm or less.

The releasable protection layer 22 may be mixed with various waxes, particles, or low-molecular substances. The particles may be particles formed from fluorine resin or silicone resin.

The image-receiving layer 23 is formed from a material with good adhesion to the adhesion layer 15 in the transfer ribbon 101 of FIG. 1. The image-receiving layer 23 preferably has a thickness of 1 μm or more and 10 μm or less.

The adhesion layer 15 in the transfer ribbon 101 and the image-receiving layer 23 in the intermediate transfer ribbon 201 are brought into contact with each other, and the transfer material layer 102 is heated by the thermal head as a transfer head for forming image cells via the back coat layer 16 in the transfer ribbon 101 to transfer the transfer material layer 102 to the image-receiving layer 23.

Figure 3:
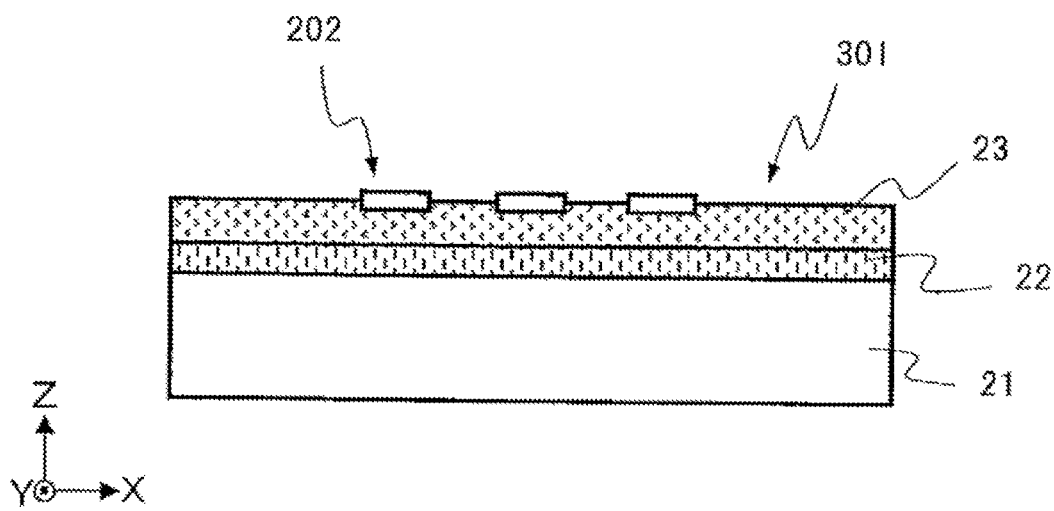
FIG. 3 is a schematic cross-sectional view of an example in which a transfer material layer is transferred to the intermediate transfer ribbon.

FIG. 3 is a schematic cross-sectional view of an example of a printed intermediate transfer ribbon 301 obtained by transferring the transfer material layer from the transfer ribbon to the intermediate transfer ribbon of FIG. 2. FIG. 3 illustrates the transfer material layer 102 in the transfer ribbon 101 as being partially transferred to the surface of the image-receiving layer 23 in the intermediate transfer ribbon 201. An aggregate of a plurality of transferred transfer material layers 202 is formed as an image on the surface of the image-receiving layer 23. That is, the transfer material layers 202 transferred to the intermediate transfer ribbon 201 are an example of image cells.

The image cells of the transfer material layers 202 thermally transferred using the thermal head typically look like dots or a long and narrow series of dots as viewed from an observation direction. In other words, on the printed intermediate transfer ribbon 301, the transfer material layers 202 look like dots or a long and narrow series of dots as viewed perpendicular to the surface where the transfer material layers 202 are formed. The plurality of image cells are positioned on grating points in a virtual plane square grating, triangular grating, or rectangular grating.

The shortest center-to-center distance of the image cells is preferably in the range of 0.085 mm or more and 0.169 mm or less, for example, in other words, about 150 dpi or more and 300 dpi or less. As the dimension is larger, it becomes more difficult to display a high-resolution image. In contrast, as the dimension is smaller, the representativeness of the pattern shape becomes more lowered.

There is a limit on the range of the size of a heat generator in the thermal head. A general thermal head has a resolving power of 0.011 mm or more and 0.021 mm or less and has a resolution of about 1200 dpi or more and 2400 dpi or less. To transfer the transfer ribbon 101 with the relief structure formation layer 13, a large quantity of energy is necessary as compared to the case of transferring a general color ribbon. Accordingly, the thermal head has a size of about 0.042 mm and a resolution of about 600 dpi. In a configuration in which the resolution of the pattern formed by the transfer material layers 202 is lower than the resolution of the thermal head, it is easy to form a predetermined space between the adjacent transfer material layers 202.

Figure 4:
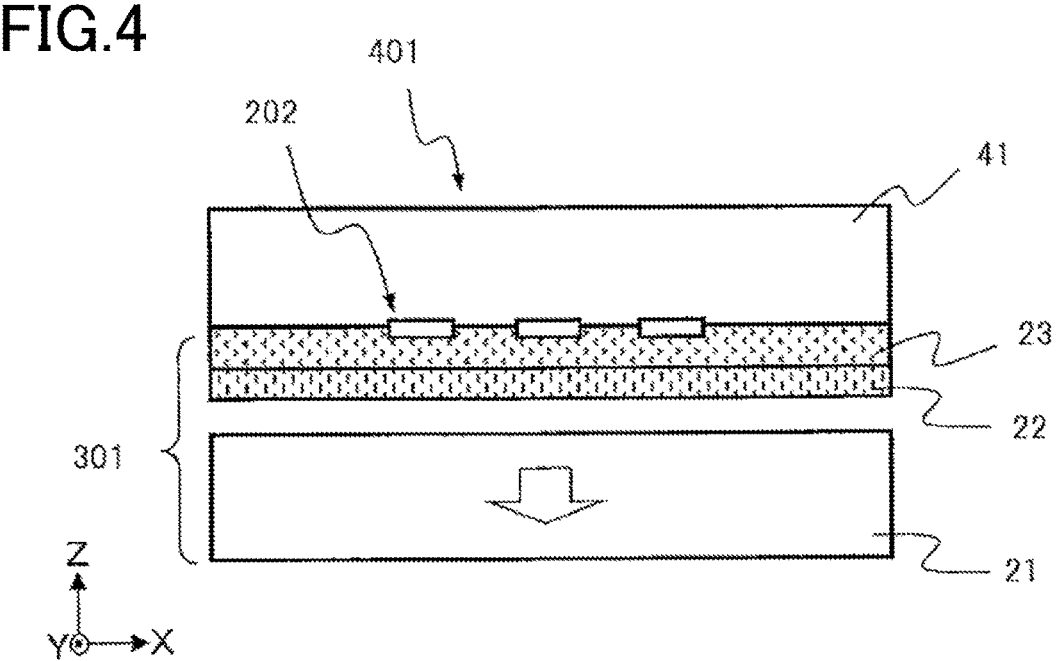
FIG. 4 is a schematic cross-sectional view of an example in which the intermediate transfer ribbon is transferred to an individual authentication medium.

FIG. 4 is a schematic cross-sectional view of an example in which the printed intermediate transfer ribbon 301 is transferred to an individual authentication medium as an image display device. The image-receiving layer 23 in the printed intermediate transfer ribbon 301 of FIG. 3 is brought into contact with a transfer body 41 in an individual authentication medium 401, the printed intermediate transfer ribbon 301 and the individual authentication medium 401 are heated and pressed to thermally transfer the transfer material layer 202, the image-receiving layer 23, and the releasable protection layer 22 onto the transfer body 41. After that, the base material 21 in the printed intermediate transfer ribbon 301 is released from the individual authentication medium 401.

Next, a method for providing image data at the time of production of an image display device using a transfer ribbon will be described. In the production of the individual authentication medium 401, for example, a portrait is taken by an image capturing device at first. Otherwise, a facial image is read from a photographic print. From this, the image information is obtained as electronic information. The facial image is subjected to image processing as necessary.

Figure 5:
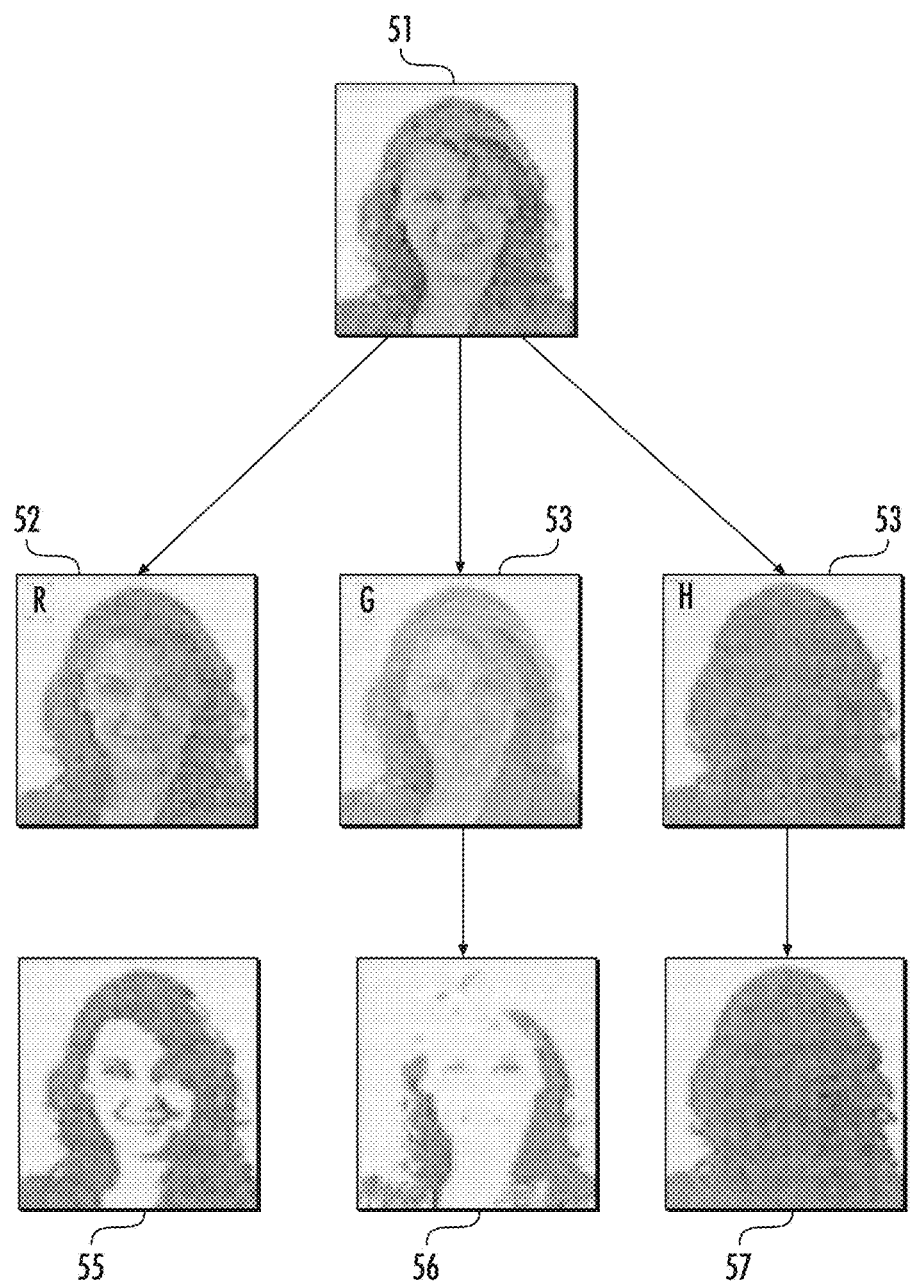
FIG. 5 is a schematic diagram illustrating an example of color separation in a color facial image.

FIG. 5 is a schematic diagram illustrating an example of color separation in an image according to the embodiment.

A color image 51 obtained by an image capturing device is subjected to color separation into the light's three primary colors, R, G, and B to provide image data of three images, an R image 52, a G image 53, and a B image 54.

The color image 51 is represented by respective colors of 8 bits (256) value levels in a generally used JPEG file; thus, the image data of the R image 52, the G image 53, and the B image 54 are represented within 256 value levels.

In an image display device produced by a transfer ribbon and a thermal head, in particular, in an image display device produced using a transfer ribbon with a relief structure on a transfer material layer, possible number of tone levels is restricted. Therefore a natural gradations representation by modulation of the thermal head for transfer in accordance with the value in 256 levels of data is difficult. In other words, a representation of the same degree of tone levels as the image data in the color image 51 on an image display device formed by direct modulation of a thermal head with the use of a transfer ribbon is difficult. The thermal head can be modulated by calories of the thermal head. The calories of the thermal head can be modulated by electricity applied to the thermal head.

Hence, to convert the color image 51 into a degenerated tone levels image, in other words, to convert into an image which has a small number of tone levels, the input image is divided in apart by the thresholds set in respective colors and respective levels, and respective images are binarized to respective levels. After the binarization, the image is dithered. By the dithering, even a few tone levels image can represent the tone of the input image in a pseudo manner. After the dithering, by setting the plural tone levels to the respective tone parameters, the data for transfer which is R image data 55 for thermal transfer, G image data 56 for thermal transfer, and B image data 57 for thermal transfer can be obtained.

For example, the input image data of the color image 51 is converted into 4 output tone levels, which are fewer than tone values of 256. In this way, the input image data is converted into multitone image data having sparser plural tone levels than the tone values of the input image data.

In this case, each tone value of the image data is converted into a tone level referred to as output tone value using the thresholds set in respective levels of the respective colors image data 55, 56, and 57. Then respective pixels of the image data are binarized in respective tone levels. In more detail, for example, in the case where the output tone values are 4 level, the image data is binarized by whether the respective pixels values are in the levels 0 to 3, and then the binarized data is dithered to provide output data. The dithering is performed according to the input tone values and the output tone values. Then the each color image data 55, 56, and 57 is synthesized from the dithered data of respective pixel levels.

The dithering is a method basically representing tone by the density of dots in a pseudo manner and is an error diffusing method adding artificial stochastic noise after thresholding. There is ordered dithering which is data processing with a predefined dithering matrix and error diffusion which is diffusing error into the vicinity for dithering.

According to the data conversion by the foregoing method, pseudo fine tone representation can be achieved on even an image display device employing an image formed from a transfer ribbon with a relief structure on a transfer material layer and a thermal head.

However, in a gradation region in which tone values vary continuously in the image, the tone appears discontinuous even after data conversion by the method. The gradation region is a region where the values of respective pixels vary continuously along the aligned order of the plural pixels constituting the image. In the gradation region with continuous variation in tone value, the values of the pixels vary such that the difference between the adjacent pixels is 1 to 3 and the tone values continuously increase or decrease along the aligned order of the plural pixels.

Hence, in this embodiment, the multitone input image is sliced into a plurality of stripe regions and a difference is set in the tone values between the adjacent regions of the image by replacement amount. Next the input image is converted into a plurality of images with fewer output tone levels than the input image. Then the input image is divided into images of respective tone levels by the thresholds set in the respective tone levels and images of respective tone levels are binarized within the respective tone values. Then, the images of respective tone levels are each dithered.

That is, in the embodiment, the input image data is interleaved before the process of decreasing the number of tone value levels in the image data 55, 56, and 57 to that smaller than the number of the tone values in the color image 51. In the interleaved image, an image having higher tone values than the input image and an image having lower tone values than the input image are alternately arranged as illustrated in FIG. 6.

Figure 6:
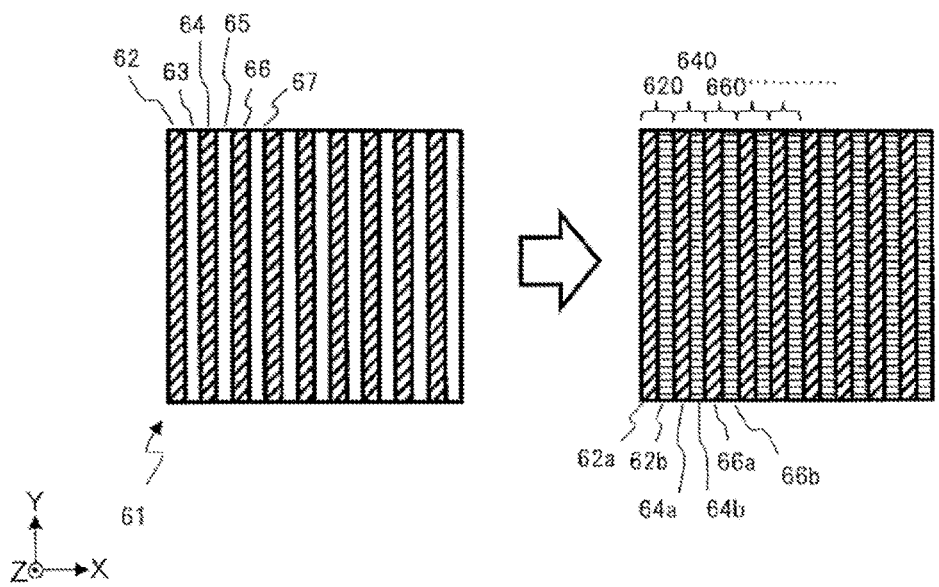
FIG. 6 is a schematic plan view of an example in which an input image is divided into a plurality of regions.

FIG. 6 is a schematic plan view of an example in this embodiment in which an input image is divided into plural regions.

In a gradation region 61 in which tone values are varied continuously, tone values of stripe regions 62, 63, 64, 65, 66, and 67 are changing stepwise. In other words, the gradation region 61 is divided into linear shaped plural regions 62 to 67 extending along one direction. Accordingly, the gradation region 61 is divided in a stripe form.

The linear coverage of the region 62 is then extended to the region 63 to form a region 620, and the region 620 is divided into two regions, a region 62a and a region 62b, that are arranged alternately within a difference in tone values. In this case, as described below, the tone value difference between the region 62a and the region 62b is made by using the replacement amount as a tone value for providing the tone value difference in two regions. In more detail, the value obtained by adding the replacement amount to the tone value set to the region 62 is set as the tone value in the region 62a, and the subtracted value obtained by subtracting the replacement amount from the tone value set to the region 62 is set as the tone value in the region 62b. This provides a difference in tone values between the two regions.

Furthermore, the linear coverage of the region 64 is extended to the region 65 to form a region 640, and the region 640 is divided into two regions, a region 64a and a region 64b, that are arranged within a difference in tone values.

Similarly, the linear coverage of the region 66 is extended to the region 67 to form a region 660, and the region 660 is divided into two regions, a region 66a and a region 66b, that are arranged with a difference in tone values.

In addition, the difference in tone values is made between the two regions constituting the region 640 and between the two regions constituting the region 660 by the same method as that for providing the difference in tone values between the region 62a and the region 62b in the region 620.

With the image data re-configured as described above, the gradation region 61 is formed from the information obtained by interleaving the plurality of stripe regions, which leads to reduction in resolution by half. That is, the information on the regions 63, 65, and 67 overlapping the extended regions 620, 640, and 660 is decimated and is not included in the re-configured data. Accordingly, the data after re-configuration is reduced in resolution to half that of the data before re-configuration.

To cover the reduction in resolution, the eliminated data can be merged in the gradation image to obtain a pseudo super-resolution image. As one covering embodiment, an averaged image which is an average of the tone image after decimation and the eliminated image after similar processing as described above can be used as gradation image.

Figure 7:
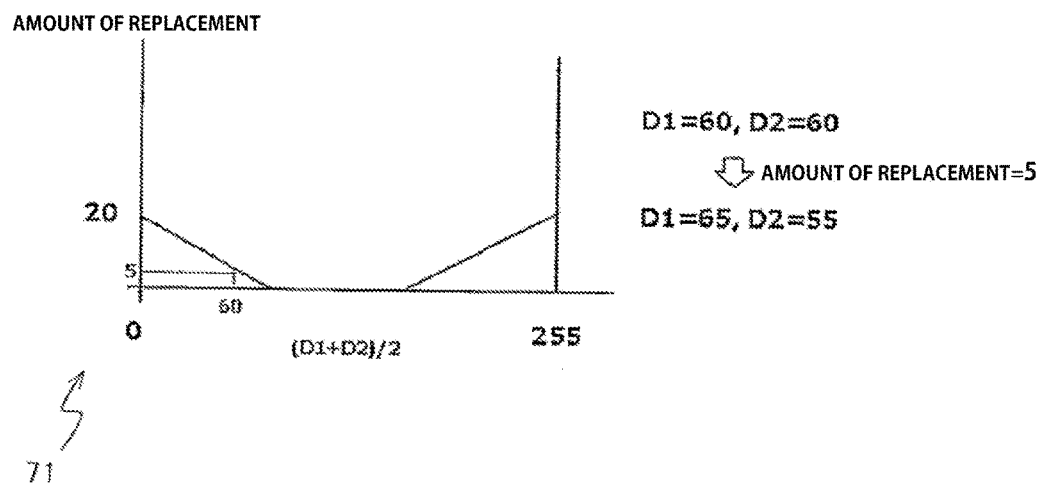
FIG. 7 is a schematic diagram illustrating tone values calculated from tone values of an input image.

FIG. 7 is a schematic diagram illustrating tone values calculated from tone values of an input image.

A graph 71 is a graph to determine the replacement amounts for tone value difference to be set from the tone values of the input image. In the graph 71, the lateral axis indicates the original tone values of 0 to 255 and the vertical axis indicates the replacement amounts set according to the tone value of the input image.

In the low-tone-value range where the tone value of the input image is within the range of 0 to 75, the replacement amount is set greater with a lower tone value. In the intermediate-tone-value range in which the tone value is within the range of 75 to 180, the replacement amount is set to 0. In the high-tone-value range in which the tone value falls within the range of 180 to 255, the replacement amount is set greater with a higher tone value. Namely, for determination of the replacement amounts, the tone values of the input image are divided into the low-tone-value range, the intermediate-tone-value range, and the high-tone-value range. In the low-tone-value range, the difference in tone values between two adjacent regions is increased with a lower tone value, and in the high-tone-value range, the difference in tone values between two adjacent regions is increased with a higher tone value. In the intermediate-tone-value range, the difference between tone values is smaller than the tone values set in the low-tone-value range and the high-tone-value range.

The replacement amounts are set in the tone-value ranges in the manner because of poor tonality in the low and high tone-value ranges in the transfer ribbon with a relief structure.

For example, when the tone value in the region 62 illustrated in FIG. 6 is 60, the amount of replacement for the tone value of 60 is 5 as shown in the graph 71.

With regard to the region 62a and the region 62b in the region 620, the tone value in the region 62a is designated as D1 and the tone value in the region 62b as D2. Since the replacement amount is 5 in these regions, the tone values D1 and D2 are set to D1=60+5=65 and D2=60-5=55.

When the tone value after replacement is 0 or less or 256 or more, the tone value is replaced by 0 or 255. When the tone value of the input image falls within the intermediate-tone-value range, the amount of replacement is 0 and thus there is no difference in tone values between two adjacent regions.

If the foregoing processing is performed in all the regions, the resolution would decrease and the output difference in tone values would be further large in the regions within an originally large difference in tone values. For this reason, the gradation regions may be extracted from the input image so that only the gradation regions with continuous variation in tone value are divided and provided with differences in tone values.

In this way, the input image with differences in tone values is converted into an image having sparser different tone values than the input image, the image is divided based on the thresholds set for the respective tone values, and respective tone values of the image are binarized by the dithering process, thereby enabling an observer to observe continuous natural gradation varying even in the gradation regions.

Figure 8:
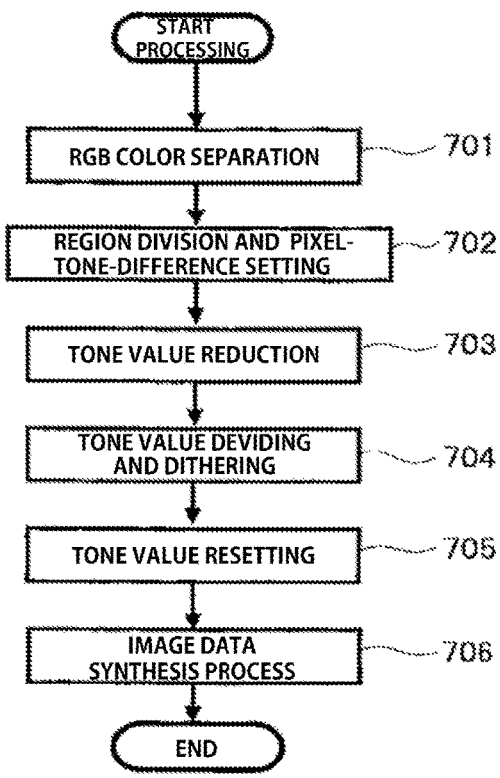
FIG. 8 is a flowchart for a conversion process according to the embodiment.
Figure 9:
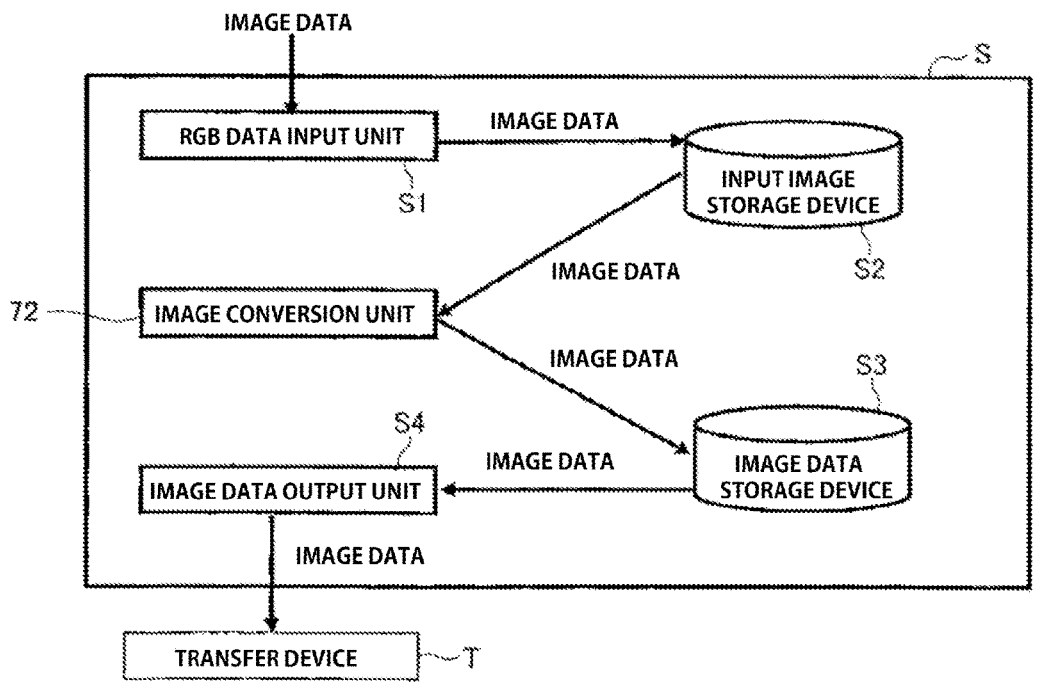
FIG. 9 is a system diagram according to the embodiment.

FIG. 8 is a flowchart for a conversion process from an input image into thermal transfer image data. The process will be described below with reference to FIG. 8 illustrating the conversion process and FIG. 9 illustrating a system configuration. The various steps described in FIG. 8 are performed by an image conversion unit described below.

As illustrated in FIG. 9, in a system S for providing thermal transfer image data, an input image, that is, input image data is outputted from an RGB data input unit S1 to an input image storage device S2 and is stored in the input image storage device S2. The input image is inputted from the input image storage device S2 into an image conversion unit 72. The image conversion unit 72 subjects the input image to an RGB color separation process 701 illustrated in FIG. 8 to divide the input image into image data of respective RGB colors.

The image data of respective RGB colors is divided into a plurality of regions, and a difference in value is made between the pixels in the adjacent regions by a region division and pixel-tone-difference setting process 702.

The image data of respective RGB colors is converted into a smaller number of tone values than those of the input image, using thresholds preset for the tone values of the respective facial image data by a tone value reduction process 703.

The image data of respective RGB colors is divided and each of the respective tone values is dithered by a tone value dividing process and dithering process 704.

The binarized tone values of the image data of respective RGB colors are set to the preset tone values by a tone value resetting process 705.

The image data of respective RGB colors is synthesized to thermal transfer image data by a thermal transfer image data synthesis process 706, and is stored in a thermal transfer image data storage device S3. Finally, the thermal transfer image data stored in the thermal transfer image data storage device S3 is outputted from a thermal transfer image data output unit S4 to a transfer device T.

Figure 10A:
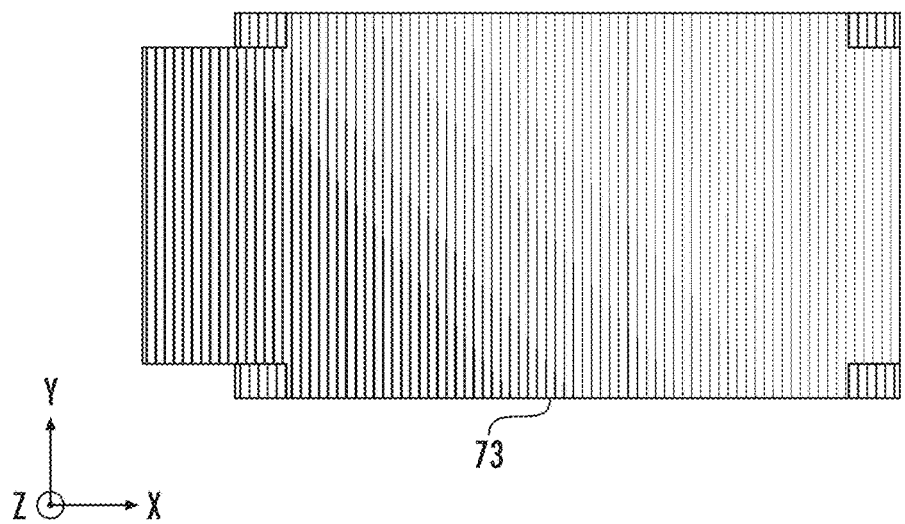
FIG. 10A illustrates gradation representation of an image formed using thermal transfer image data provided by another method for providing thermal transfer image data.
Figure 10B:
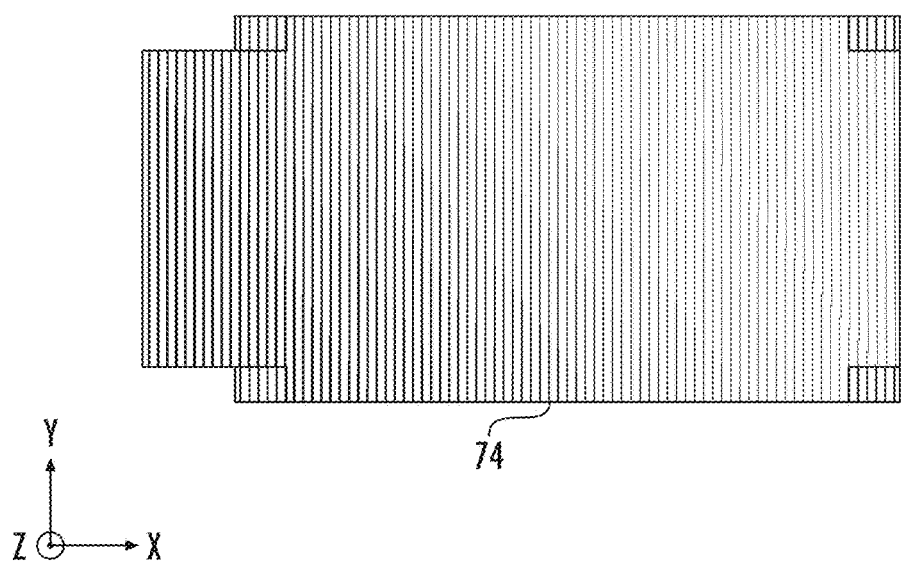
FIG. 10B illustrates gradation representation of an image formed using thermal transfer image data provided by a method for providing thermal transfer image data according to the embodiment.

FIG. 10A is a schematic diagram illustrating an image formed from thermal transfer image data provided by another conversion method, and FIG. 10B is a schematic diagram illustrating an image formed from thermal transfer image data provided by the conversion method of the embodiment.

As illustrated in FIG. 10A, an image file, that is, image data with 256 tone value levels in which the tone value continuously and gradually varies from the upper left to lower right in the drawing plane is provided. The image is divided into output tone values by thresholds set for the respective tone values and respective tone values are binarized by a dithering process, thereby converting the image data into thermal transfer image data. An image 73 is provided by the thermal transfer image data.

Then, as illustrated in FIG. 10B, an image 74 is formed using thermal transfer image data provided using the same image file, that is, the same image data, by the conversion method of the embodiment. That is, the input image with 256 tone value levels is divided into a plurality of regions, and a difference between tone values is made in the adjacent regions of the image. After that, the input image is divided into four tone levels by thresholds set for the respective tone levels and the respective tone values are binarized by a dithering process, thereby converting the image data into thermal transfer image data. The image 74 is provided by the thermal transfer image data.

In the image 73, stepwise diagonal lines can be observed from the upper left to lower right in the drawing plane; whereas in the image 74, diagonal lines become pale, so that gradation representativeness is improved. In other words, in the image 73, straight lines extending from the upper left to lower right in the drawing can be seen in the area with variation in tone value, whereas in the image 74, such straight lines can be hardly observed.

As described above, by the method for providing thermal transfer image data in the embodiment, the following advantageous effect can be obtained when part of the transfer material layer formed in the transfer ribbon is transferred to the image-receiving layer in the intermediate transfer ribbon and the plural image cells formed in the intermediate transfer ribbon are used to produce the image display device. By this, at the time of providing of the thermal transfer image data for forming the image cells, the thermal transfer image data can be provided without reduction in the representativeness of gradations even in portions of the input image with continuous variation in tone value. In other words, the method reduces or even prevents reduction in the representativeness of gradations in the image data on the image display device produced using the thermal transfer image data.

In the embodiment, the method for providing thermal transfer image data includes dividing the input image into a plurality of interleaved regions and providing a difference in tone values between adjacent ones of the plurality of regions in the image is described. However, the method for providing thermal transfer image data is not limited to this but any other method not including these two processes but including converting the input image into a multitone image having fewer tone value levels and dithering respective tone values of the converted image could provide the advantageous effect described below. Consequently, it is possible to provide thermal transfer image data without tone reconstructivity reduction of the input image tone as compared to the method which converts simply the input image into a multitone image which has a reduced number of tone levels.

Next, an image display device producing method using the thermal transfer image data provided by the foregoing method for providing thermal transfer image data will be described.

Figure 11:
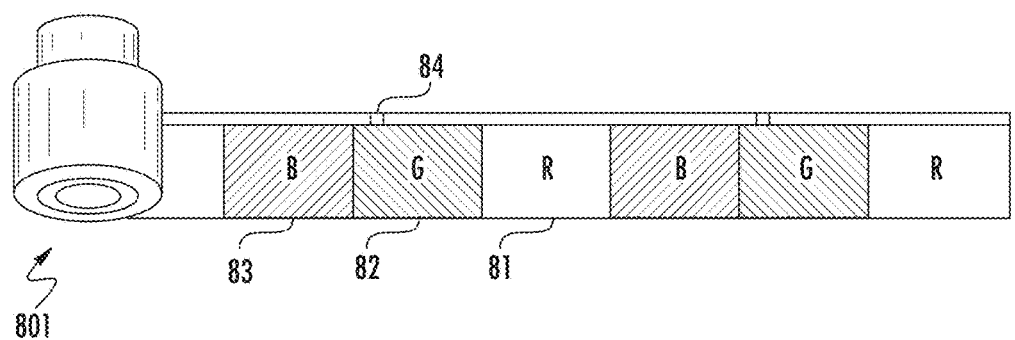
FIG. 11 illustrates an example of structure of a transfer ribbon.

FIG. 11 illustrates an example of the structure of a transfer ribbon according to the embodiment. A transfer ribbon 801 has the same layer structure as the transfer ribbon 101 of FIG. 1 and is formed in a roll form. The transfer ribbon 801 is separated into plural regions in a lengthwise direction, and the respective regions have diffraction structures different from each other. In other words, the plural regions in the transfer ribbon 801 include regions which have diffraction structures different from one another.

Specifically, the plurality of regions in the transfer ribbon 801 include an R region 81, a G region 82, and a B region 83 which are repeatedly aligned in this order in the lengthwise direction. In the R region 81, the G region 82, and the B region 83, the spatial frequency of the relief structure changes so that the diffraction light of respective RGB colors can be observed from an optimum observation position. That is, the spatial frequency of the relief structure is different from one another among the R region 81, the G region 82, and the B region 83.

A registration mark 84 is provided for aligning the each region in the transfer position where transfer to a transfer object is performed at the printing using the each region. In this case, the registration mark 84 is a mark from which diffraction light is emitted by the relief structure in a specific direction. The diffraction light from the registration mark 84 is read by a set of a light source and an optical sensor, and the regions are positioned based on the read diffraction light.

Next, an intermediate transfer ribbon having the same layer structure as the intermediate transfer ribbon 201 of FIG. 2 and formed in a roll form is prepared. Then, the adhesion layer in the transfer ribbon 801 and the image-receiving layer in the intermediate transfer ribbon are brought into contact with each other, and the transfer ribbon 801 is heated by the thermal head from the back coat layer in the transfer ribbon 801 to transfer the transfer material layer to the image-receiving layer, thereby forming an image. The image can be formed by modulating the thermal head according to the tone parameter of the image data and transferring the image cells to transfer the transfer material layer to the image-receiving layer. The thermal head can be modulated by the calorie of the thermal head. The calorie of the thermal head can be modulated by controlling applied electricity to the thermal head. The electricity can be modulated by controlling the voltage, by controlling the current value, or by the electricity pulse controlling the electricity at a ratio of on width to off width of the pulse, or by the combination of these methods.

The volume of the electricity to be applied to the thermal head can be a preset parameter corresponding to the tone value of the image data. The preset parameter can correspond to the tone value of each image data to be transferred. The preset value can also correspond to the tone value of the image data to be transferred and the tone value of the image data having been previously transferred. The preset value corresponding to the tone value of the image data to be transferred and the tone value of the image data having been previously transferred can be a value that is overdriven according to the difference between the tone value of the image data to be transferred and the tone value of the image data having been previously transferred. Since the number of tone levels for use in transfer is less than the number of tone levels in the original image, the number of the preset parameter can be decreased.

To form a color image by transferring the transfer material layer to the image-receiving layer, the data of three RGB primary colors are overlapped and transferred to the same place in the intermediate transfer ribbon. In other words, to form a color image, the image cells of the color image are transferred to one region for forming the color image in the intermediate transfer ribbon, using the thermal transfer image data of the R, G, and B colors.

The thermal transfer image data used in transferring data with the thermal head to form an image includes the R image data 55 for thermal transfer, the G image data 56 for thermal transfer, and the B image data 57 for thermal transfer illustrated in FIG. 5. To perform transfer by the thermal head according to the R image data 55 for thermal transfer, the image data is transferred by the thermal head to the intermediate transfer ribbon using the R region 81 in the transfer ribbon 801. To perform transfer by the thermal head according to the G image data 56 for thermal transfer, the image data is transferred by the thermal head to the intermediate transfer ribbon using the G region 82 in the transfer ribbon 801. To perform transfer by the thermal head according to the B image data 57 for thermal transfer, the image data is transferred by the thermal head to the intermediate transfer ribbon using the B region 83 in the transfer ribbon 801. Accordingly, a color facial image can be observed on the intermediate transfer ribbon after transferring data by the thermal head.

Next, the image-receiving layer in the intermediate transfer ribbon is brought into contact with the transfer body of the individual authentication medium, and the intermediate transfer ribbon is heated and pressed to thermally transfer the transfer material layer, the image-receiving layer, and the releasable protection layer from the intermediate transfer ribbon to the transfer body. After that, the base material of the intermediate transfer ribbon is released from the individual authentication medium.

According to the method described above, the following advantageous effect can be obtained when parts of the transfer material layer in the transfer ribbon are transferred to the image-receiving layer in the intermediate transfer ribbon and the plurality of image cells formed on the intermediate transfer ribbon are used to produce the image display device. That is, the thermal transfer image data can be provided with no reduction of the tone reconstructivity even in portions of the input image with continuous variation in the tone value, thus producing the image display device such as an individual authentication medium.

The transfer object of the transfer material layer is not limited to the image-receiving layer in the intermediate transfer ribbon but may be an image-receiving layer in the image display device such as an individual authentication medium, for example. In this case, the same advantageous effect as that in the case of forming the plurality of image cells on the intermediate transfer ribbon can be obtained.

Figure 12:
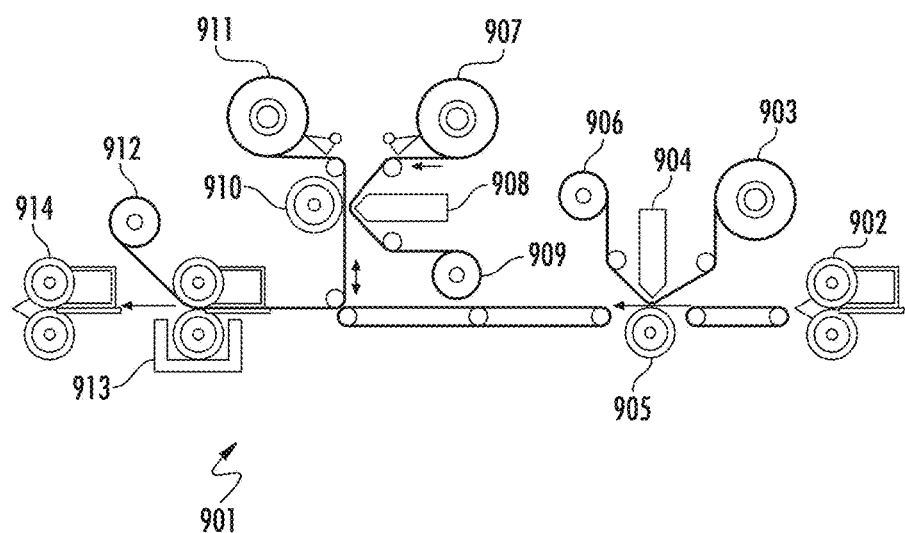
FIG. 12 is a schematic view of an example of a printer.

FIG. 12 is a schematic view of a printer example of the embodiment.

A printer 901 illustrated in FIG. 12 is a printer that is able to print an individual information image formed from a relief structure on a booklet for a passport.

The passport booklet inserted into the printer 901 through a booklet insertion unit 902 contacts a primer ribbon fed by a primer unwinder 903 and a primer winder 906. Then, a primer layer in the primer ribbon is transferred onto a transfer surface of the booklet by a primer transfer head 904 and a primer platen roll 905.

The primer ribbon used here is a ribbon that, in case the adhesion between the transfer surface of the booklet and the intermediate-transferred transfer material layer is poor, transfers the primer layer to the booklet to increase the adhesiveness of the transferred surface at the position where the transfer material layer is to be transferred. The primer ribbon is formed from a rolled base material and a primer layer releasably supported by the base material, and the material for the primer layer is a heat-sensitive adhesive.

Next, a central unit feeds a transfer ribbon using a transfer ribbon unwinder 907 and a transfer ribbon winder 909, allowing the intermediate transfer ribbon fed from an intermediate transfer ribbon unwinder 911 to contact the transfer ribbon. The central unit then transfers the image from the transfer ribbon to the intermediate transfer ribbon using an image transfer head 908 and an image platen roll 910.

The step of transferring the image in the transfer ribbon and the step of transferring the primer layer can proceed at the same time. Therefore, at injecting a booklet, printing simultaneously an image on another booklet would reduce the interval time to the next step, which leads to decreasing of the total printing time, in other words, the total time taken for printing plural booklets.

Next, the intermediate transfer ribbon with the transferred image is wound up by an intermediate transfer ribbon winder 912, the booklet with the transferred primer layer is conveyed by a conveyor, the image position on the intermediate transfer ribbon and the transfer position on the booklet are adjusted, and then the intermediate transfer ribbon and the booklet are brought into contact with each other. As the intermediate transfer ribbon and booklet contacting each other are passed through a thermal transfer unit 913, these are heated and pressed. Thus, the transfer material layer, the image-receiving layer and the releasable protection layer transferred on the intermediate transfer ribbon are thermally transferred to the booklet. Then, the base material of the intermediate transfer ribbon is released by the intermediate transfer ribbon winder 912, and the outermost surface of the booklet covers a releasable protection layer.

The printed passport booklet is ejected from the printer 901 by a booklet ejection unit 914. Finally, the formation of the passport with the image is finished.

In the above description, the individual authentication medium as a passport is exemplified. However, the technology described above is also applicable to other individual authentication media. For example, the technology is applicable to various cards such as visas and ID cards.

The material for the transfer body of the individual authentication medium may not be paper. For example, the material may be a plastic substrate, a metal substrate, a ceramic substrate, or a glass substrate.

The image to be displayed on the transfer material layer can include biometric information in addition to or instead of a facial image. The image to be displayed on the transfer material layer may include at least one of non-biometric individual information and non-individual information in addition to or instead of biometric information.

REFERENCE SIGNS LIST

101 . . . Transfer ribbon; 102 . . . Transfer material layer; 11 . . . Base material; 12 . . . Release layer; 13 . . . Relief structure formation layer; 14 . . . Reflection layer; 15 . . . Adhesion layer; 16 . . . Back coat layer; 201 . . . Intermediate transfer ribbon; 21 . . . Base material; 22 . . . Releasable protection layer; 23 . . . Image-receiving layer; 202 . . . Transfer material layer; 301 . . . Printed intermediate transfer ribbon; 401 . . . Individual authentication medium; 41 . . . Transfer body; 51 . . . Color image; 52 . . . R image; 53 . . . G image; 54 . . . B image; 55 . . . R image data for thermal transfer; 56 . . . G image data for thermal transfer; 57 . . . B image data for thermal transfer; 61 . . .

Gradation region; 62, 63, 64, 65, 66, 67 . . . Region; 62*a*, 62*b*, 64*a*, 64*b*, 66*a*, 66*b* . . . Region; 620, 640, 660 . . . Region; 71 . . . Graph; 72 . . . Image conversion processing unit; 73 . . . Image; 74 . . . Image; 801 . . . Transfer ribbon; 81 . . . R region; 82 . . . G region; 83 . . . B region; 84 . . . Registration mark; 901 . . . Printer; 902 . . . Booklet insertion unit; 903 . . . Primer unwinder; 904 . . . Primer transfer head; 905 . . . Primer platen roll; 906 . . . Primer winder; 907 . . . Transfer ribbon unwinder; 908 . . . Image transfer head; 909 . . . Transfer ribbon winder; 910 . . . Image platen roll; 911 . . . Intermediate transfer ribbon unwinder; 912 . . . Intermediate transfer ribbon winder; 913 . . . Thermal transfer unit; 914 . . . Booklet ejection unit.

What is claimed is:

1. A method for providing thermal transfer image data, the thermal transfer image data being used to transfer part of a transfer material layer in a transfer ribbon to an image-receiving layer to form therein an image comprising a plurality of image cells, comprising:
    obtaining a multitone input image having a plurality of input tone values;
    dividing the input image into a plurality of interleaved regions, each of which corresponds to an input tone value of said plurality of input tone values;
    converting the multitone input image into a multitone image having a plurality of output tone values, wherein a number of the output tone values is less than a number of the input tone values, such the converted image comprises a plurality of extended regions, each of which a) corresponds to an output tone value of said plurality of output tone values and b) extends over multiple interleaved regions of the input image;
    dividing the input tone values of the input image into a low-tone-value range, an intermediate-tone-value range, and a high-tone-value range;
    in the low-tone-value range, setting a low tone value replacement amount to continuously increase with decreasing of the tone value;
    in the high-tone-value range, setting a high tone value replacement amount to continuously increase with increasing of the tone value; and
    in the intermediate-tone-value range, setting an intermediate-tone value replacement amount to be 0; and,
    dithering each of the extended regions to provide the thermal transfer image data, said dithering comprises adding a corresponding replacement amount to the output tone value of the extended region for a first interleaved region and subtracting the replacement amount from the output tone value of the extended region for the second interleaved region.

2. The method of claim 1, wherein dividing the input image into a plurality of interleaved regions comprises dividing the input image into a plurality of stripes.

3. The method of claim 1, further comprising forming an image comprising a plurality of image cells in an image-receiving layer based on the provided thermal transfer image data.

4. The method of claim 3, wherein said forming the image comprises transferring a part of a transfer material layer formed in a transfer ribbon to the image-receiving layer so that the plurality of image cells is formed of transferred transfer layer material.

5. The method of claim 4, wherein the transfer material layer formed in the transfer ribbon comprises a relief structure.

6. The method of claim 4, wherein said transferring comprises transferring the transfer material layer by a thermal head.

7. The method of claim 4, wherein the transfer material layer comprises a release layer, a relief structure formation layer, a reflection layer, and an adhesion layer.

8. The method of claim 4, wherein the image-receiving layer is a part of an intermediate transfer ribbon.

9. The method of claim 8, herein the intermediate transfer ribbon comprises a base material and the image-receiving layer releasably supported by a releasable protection layer.

10. The method of claim 9, wherein the base material comprises a heat-resistant material.

11. The method of claim 3, wherein the image-receiving layer has a thickness of 1 µm or more and 10 µm or less.

12. The method of claim 1, wherein the setting the low tone value replacement amount comprises setting the low tone value replacement amount to linearly increase with decreasing of the tone value; and
    the setting the high tone value replacement amount comprises setting the high tone value replacement amount to linearly increase with increasing of the tone value.

* * * * *